Oct. 25, 1932.  H. E. WOODRING  1,884,950
MEANS FOR THE DETECTION OF ELECTRICITY
Filed June 27, 1930
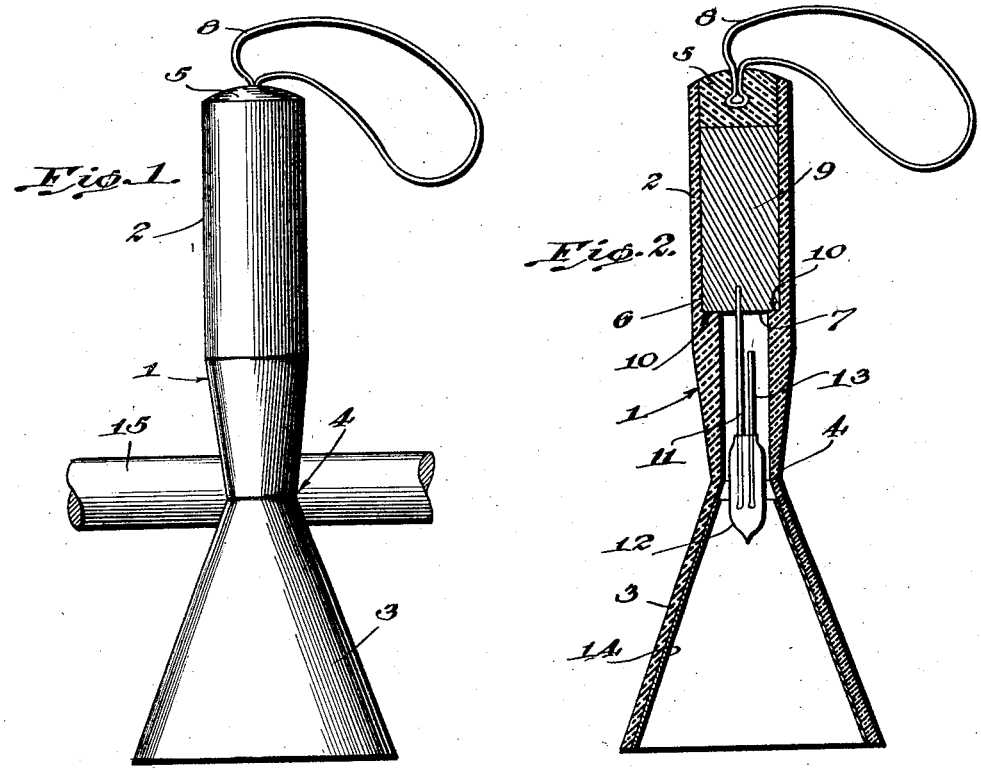
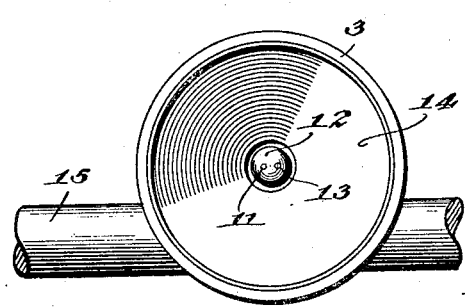
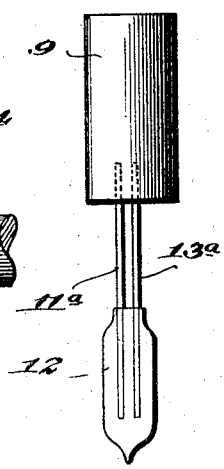
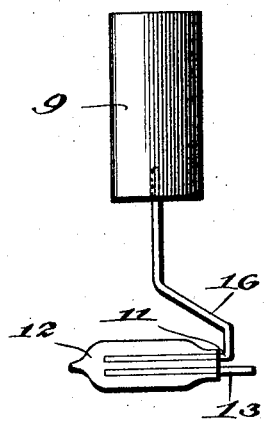
INVENTOR
H. E. Woodring,
BY
ATTORNEY Patented Oct. 25, 1932

1,884,950

UNITED STATES PATENT OFFICE

HUBERT E. WOODRING, OF DENVER, COLORADO

MEANS FOR THE DETECTION OF ELECTRICITY

Application filed June 27, 1930. Serial No. 464,387.

My invention relates to means for detecting the presence of an electric current or potential more particularly to means for detecting the presence of an electric current or potential in high voltage lines whether the same be insulated or not, and it consists in the constructions, arrangements and combinations herein shown and described.

It is common knowledge that every year many workers and others are injured or fatally burned by contact with electric conductors of both high and low voltage, such accidents particularly happening to employees of electric power companies who work in the sub-stations and similar departments of said electric power companies employing high voltage. A great number of these accidents also occur when linemen are working on high voltage and other lines in the field. These disasters take place because there is no means for the workers or others to determine the presence of electricity in a conductor such as wire without subjecting themselves to possible contact with such wire, after which, of course it is too late, as the damage has been done by said contact. It is therefore a primary purpose of my invention to provide a means for automatically determining the presence and the degree of strength of an electrical current or potential in a line or similar conductor without possible subjection of the body of the operator to contact with said line or conductor, thereby to reduce or eliminate the number of accidents attributal to failure to ascertain the presence or absence of an electric current or potential in a conductor.

It is a further object of my invention to provide a device of the type described which is operable whether brought into contact with the conductor or merely brought into proximity therewith.

A still further object of my invention is to provide, a device of the type described which has few parts, is simple to manufacture and does not get out of order easily.

Other objects and advantages will appear as the specification proceeds and the invention will be more particularly defined in the appended claims.

My invention is illustrated in the accompanying drawing forming a part of this specification, in which;

Figure 1 is an elevational view of my device in operation;

Figure 2 is a sectional view of my device, with parts thereof shown in elevation for clearness of illustration;

Figure 3 is a bottom plan view of my device;

Figure 4 is an elevational view of a modified form of my device; and

Figure 5 is an elevational view of a further modified form of my device.

In carrying out my invention I provide an elongated tubular member 1 composed of an insulating material of high dielectric quality. This tubular member 1 has a handle portion 2 for the reception of portions of the device and for engagement with the hand of an operator, a flared portion 3 through which a signal is given to said operator by means soon to be described, and a reduced portion 4 between the portions 2 and 3 for facilitating operation as will soon be described.

In the end of the handle 2 a cap member 5 is secured in any suitable fashion to form a chamber 6 in said handle 2, which chamber is provided with an open end 7 for a purpose soon to be described. This cap member 5 is also formed of insulating material of high dielectric quality, thus providing a suitable portion of my device for engagement with a loop 8 whch loop acts as a handle to be engaged by the hand of an operator or a stick as desired during the operation.

In the chamber 6 I mount an electric absorbent member 9, which may be an iron core, a copper core, etc. which I preferably use in my device. This electric absorbent is held securely in the chamber 6 by means of the cap member 5 and the shoulders 10 of said chamber. It is provided to act as a ground or electric current absorbent and to also increase the strength of the magnetic field when brought into the presence of electric currents for purposes which will soon be made clear.

Anchored or sunk in this electrical absorbent 9 is an electrical conductor 11 which may be formed of copper or any other suitable material, and which forms one of the terminals of a rare gas lamp globe 12, such as a neon lamp. The other terminal of this neon lamp 12 is indicated at 13 and will be seen from an examination of Figure 2 to project outwardly from the globe a short distance to terminate in spaced relation with the electrical absorbent 9 and other portions of the device. This rare gas or neon light as is also clearly seen from Figure 2, is situated substantially at the apex of the conically flared portion 3.

For reflecting the rays of light from the rare glass lamp 12, when the same is operated, the inner surface of this conically-flared portion 3 has secured therein a reflector 14 which reflects the rays of the lamp as is easily understood.

In using my device for determining the presence or absence of an electrical current in a conductor the operator by means of a stick projecting through the loop 8 or by engagement with said loop 8 or handle 2 with his hands places the device in proximity to the conductor such as the wire 15 with the reduced portion 4 of the device preferably immediately adjacent the wire. The device will operate with great efficiency also if placed in parallelism with the conductor. Inasmuch as high voltages and other voltages are transmitted by alternating currents my device will thus be introduced into a changing magnetic field about the wire 15 caused by the flow of said alternating current.

This changing magnetic field will cause currents to flow in the electrical conductors 11 and 13 of the rare gas lamp 12 in accordance with the well known physical principle which needs no explanation. The current induced in the terminal 11 will be greater than that induced in the terminal 13 due to the presence of the electric absorbent 9 which may increase the magnetic field about said wire 11. The current of terminal 11 also will be absorbed in this electric absorbent and dissipated in the form of a magnetic field in and about the same.

The situation of the conductors 11 and 13 in close proximity to one another causes the same to act as a condenser between those adjacent portions immediately outside of the neon tube 12.

The above construction thus causes a current to flow through the terminals 11 and 13 to ignite the lamp 12, current flowing from terminal 13 to terminal 11 and through the portions acting as the condenser. This ignition of the lamp 12 is reflected to the operator by the reflector 14 thus indicating the presence of a current in the line 15 having a sufficient voltage to create a magnetic field of great enough magnitude to light the lamp. The device may be so constructed and graduated as to light only upon the presence of a voltage of a predetermined degree in the wire 15 and the amount of voltage may be determined by the brightness of the lamp. In assuring safety to the operator and for determining the amount of voltage present the device may be first tested on a known voltage then put in proximity with the unknown voltage and again tested on a known voltage, thus assuring operation of the device with a consequent true indication of the presence or absence of the current.

In Figure 4 I show a modified form of my construction which is adapted to have the terminals of the lamp 12 positioned in parallelism with the line 15 with greater ease to the operator. This is accomplished by bending one of the terminals, as indicated at 16, to a position substantially at right angles to the position occupied by the lamp and then connecting the same to the electric absorbent as before. The other terminal is left as in the former device. When the lamp is placed in parallelism with the conductor more of the terminals are cut by the magnetic field and a greater current is induced than when the conductors are placed at a normal to the wire. Of course in this form of the invention the casing for the device must be bent at the reduced portion and the flared member 3 placed at right angles to the handle in the casing of the core 9. The construction of this casing can be easily understood from an examination of Figure 2 and need not be further described.

The operation of this form of the invention is substantially similar to that form shown in Figure 2 the operator bringing the handle (not shown) of the casing about the core of this modified form into proximity with the conductor and at right angles therewith in the same manner in which the prior form is brought into engagement with the wire as shown in Figure 1. This of course, as can be easily understood positions the lamp 12 in parallelism with the conductor and the terminals 13 and 11 also in parallelism.

In Figure 5 I show a further modified form in which both the terminals 11ᵃ and 13ᵃ are grounded in the core 9. The lamp 12 is the same as in the modification of Figure 2 and need not be further described.

The operation of this form of the device is substantially the same as that of Figures 1 and 2, with the exception that the condenser action is omitted.

It is thus seen that I have provided a means for detecting the presence or absence of an electric current or potential of a conductor which enables an electrical worker to easily and certainly determine the presence or absence of an electric current or potential without contacting the conductor of said electric current or potential and with consequent small danger to himself of electrocution or serious injury.

It is also seen that I provide a device which is simple to manufacture and efficient in operation.

I claim:

1. A means for determining the presence or absence of an electric current or potential in a conductor comprising a signal adapted for actuation by an electric current and means for causing a flow of electric current through said signal for the actuation thereof upon the placing of said means in the magnetic field induced by a current or potential in said conductor, said means consisting of a pair of conductors forming the terminals of said signal and positioned in close proximity to one another to act as a condenser upon the flow of an induced current therethrough.

2. A means for determining the presence or absence of an electric current or potential in a conductor comprising a signal adapted for actuation by an electric current and means for causing a flow of electric current through said signal for the actuation thereof upon the placing of said means in the magnetic field induced by a current or potential in said conductor, said means consisting of a pair of conductors forming the terminals of said signal and placed in close proximity to one another to act as a condenser, one of said conductors having a core of electrical energy absorbent material associated therewith to increase the induced current as well as for absorbing current from said conductor.

3. Means for detecting the presence or absence of an electric current or potential in a conductor comprising a casing having a handle portion and a flared portion, a lamp positioned at the substantial apex of said flared portion, a reflector positioned in said flared portion for reflecting the rays of said lamp, and means in said handle connected to said lamp for the induction of current through said lamp upon being brought into the magnetic field caused by a current or potential in said conductor.

4. Means for detecting the presence of a current or potential in a conductor comprising a lamp and means for inducing the current to flow through said lamp from the magnetic field created by the current or potential in the conductor comprising conductors projecting from said lamp, one of said conductors having a free end and the other of said conductors being bent at right angles to said lamp for facilitating the positioning of said lamp and conductors in parallelism with the first named conductor, said second named conductors being adapted to act as a condenser.

5. A means for detecting the presence of electricity in a conductor comprising a lamp, conductors comprising the terminals of said lamp and a suitable electrical energy absorbent material engageable about portions of said conductors, whereby a flow of current through said lamp will be effected when brought into the magnetic field of said first named conductor.

6. A means for detecting the presence of an electrical potential comprising a lamp having electrical conductors formed in the terminals thereof and electrical energy absorbent material engageable about a portion of one of said conductors, said conductors being adapted to act as a condenser when brought into the magnetic field produced by the potential for causing a flow of current through said lamp.

HUBERT E. WOODRING.